F. WYATT.
HAY STACKER.
APPLICATION FILED JAN. 9, 1909.

952,490.

Patented Mar. 22, 1910.

2 SHEETS—SHEET 2.

Inventor
Frank Wyatt

Witnesses

By
, Attorneys.

UNITED STATES PATENT OFFICE.

FRANK WYATT, OF SALINA, KANSAS, ASSIGNOR TO THE F. WYATT MANUFACTURING COMPANY, OF SALINA, KANSAS.

HAY-STACKER.

952,490.  Specification of Letters Patent.  Patented Mar. 22, 1910.

Application filed January 9, 1909. Serial No. 471,482.

*To all whom it may concern:*

Be it known that I, FRANK WYATT, citizen of the United States, residing at Salina, in the county of Saline and State of Kansas, have invented certain new and useful Improvements in Hay-Stackers, of which the following is a specification.

This invention comprehends certain new and useful improvements in machines for stacking hay and the like in the field, and the invention relates particularly to improvements in that type of hay stacker such as is disclosed in my prior patent #738,390, dated September 8, 1903, and in a copending application filed December 28, 1908, Serial No. 469,588. These hay stackers just mentioned comprise a traveling supporting framework, a crane or rake support mounted to rock on said framework so as to raise the load, and a tilting fork carried by the crane and arranged to dump the load upon the stack that is being formed. The crane is tilted to raise the fork or rake by horse power through the instrumentality of a cable secured to one end of the crane and a drum mounted upon the front axle of the machine which is arranged to turn with the front ground or traveling wheels, and the drum is mounted loosely upon the axle and is arranged to be engaged by a clutch operated by the driver on a seat at the rear of the machine. The drum is provided with a ratchet so that after the crane has been tilted to raise the load, the clutch may be thrown out and a pawl engaged with the ratchet to hold the drum stationary with the rake or fork in elevated position so that the machine can be drawn to the stack preparatory to dumping or tilting the rake.

The present invention has for its object an improved construction of clutch and pawl operating mechanism, whereby both the clutch and the pawl are handled by the one lever and operated alternately thereby, the clutch being positively thrown in when the pawl is raised and the pawl being positively engaged with the ratchet wheel of the drum when the pawl is thrown out, thereby avoiding any liability of accidentally permitting the fork to fall, which would obviously cause more or less damage.

The invention consists in certain constructions, arrangements and combinations of the parts that I shall hereinafter fully describe and claim.

For a full understanding of the invention, reference is to be had to the following description and accompanying drawings, in which:—

Figure 1:
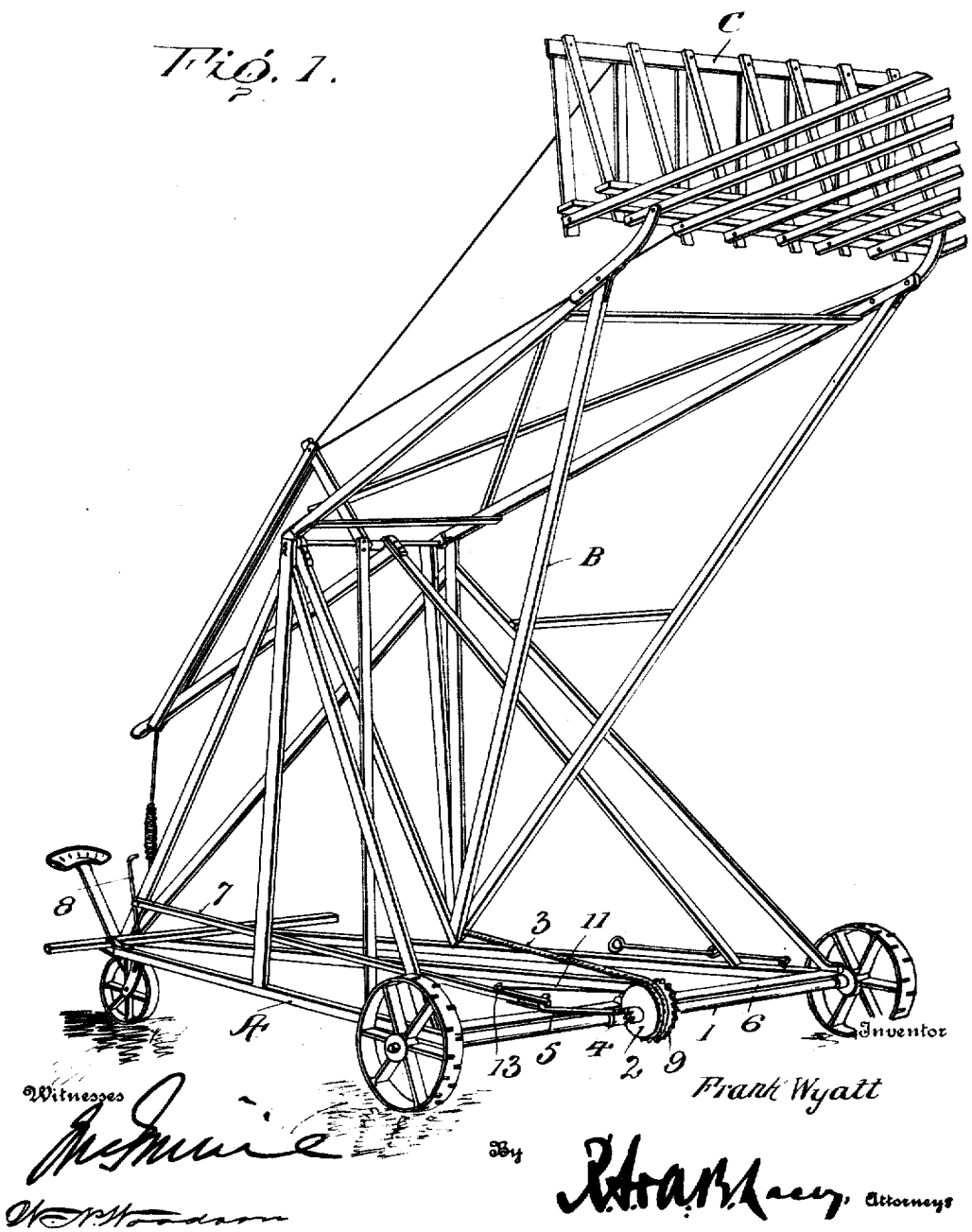
Figure 2:
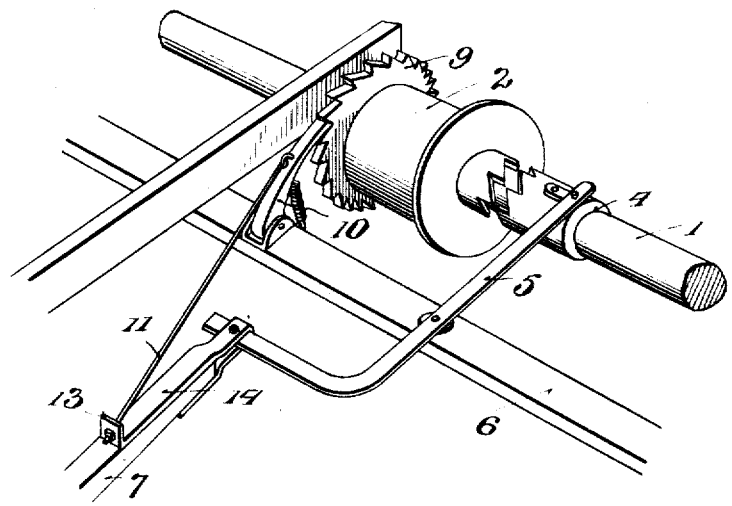
Figure 3:
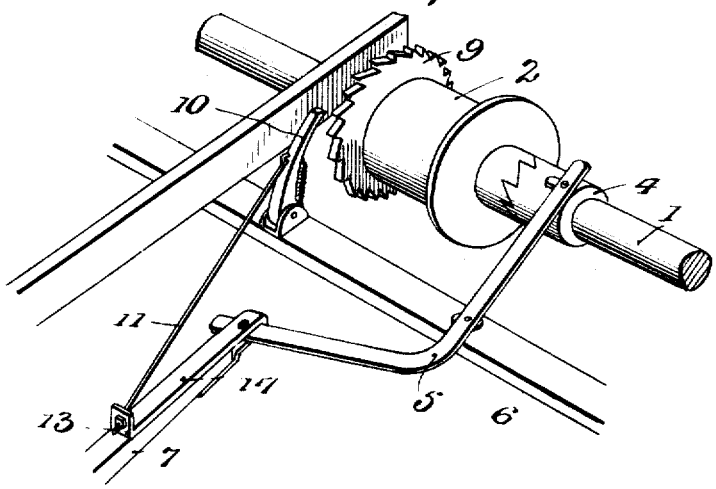

Figure 1 is a perspective view of a hay stacker embodying the improvements of my invention, and Figs. 2 and 3 are detail perspective views on an enlarged scale of the clutch mechanism, the parts being shown in different positions in the two views.

Corresponding and like parts are referred to in the following description and indicated in all the views of the drawings by the same reference characters.

Referring to the drawings, A designates the supporting framework of a hay stacker embodying the improvements of my invention, B the fork or rake support and C the tilting rake which is carried by the support.

1 designates the front axle of the machine which is mounted to turn with the front ground or traveling wheels, 2 the drum which is mounted loosely on the axle and which is connected to one end of the rake support B by means of a cable or rope 3, and 4 the clutch which is mounted on the axle and which is designed to couple the drum 2 to the axle.

An angular shipper-lever 5 is connected at one end to the clutch 4, said lever being fulcrumed on the front cross-beam 6 of the supporting framework A and the rear arm of said lever is pivotally connected to the front end of a rearwardly extending actuating rod 7 adapted to be manipulated by a handle lever 8 secured thereto and mounted upon the rear end of the framework in convenient proximity to the driver's seat.

The drum 2 is provided with a ratchet wheel 9 as shown and a pawl 10, preferably spring-pressed into engagement with the ratchet 9 and which is mounted between the ears of a bracket that is secured to the cross-beam 6. A link-rod 11 is connected at its front end to the pawl 10, the rear end of the link-rod being screw-threaded as shown and adjustably mounted in the upwardly extending angular end 13 of one of the straps 14 that pivotally connect the actuating rod 7 to the rear arm of the lever 5.

From the foregoing description in connection with the accompanying drawings, it is evident that when the operator moves the actuating rod 7 forwardly, to swing the lever 5 in a direction to slide clutch 4 out of engagement with the drum 2, the link-rod 11 will positively swing the pawl 10 into engagement with the ratchet 9 to hold the drum as against any reverse rotation on the axle 1, and hence the rake or fork C will be positively held in an elevated position and will be prevented from falling. Both the clutch and the pawl are operated by the one hand lever and there is no chance whatever for the fork to accidentally fall.

In the practical operation of my improved hay stacker, when it is desired to elevate the rake and its load, the shipper lever 5 is elevated to clutch the sleeve 4 with the drum 2. When the rake is in its uppermost position, the shipper lever is again operated, this time to unclutch the sleeve 4 and the drum 2 and at the same time to throw the pawl 10 against the ratchet 9. In this way the apparatus is transported to the place where it is desired to deposit the load. After the load has been dumped on the stack, the rake may be again lowered by again clutching the sleeve 4 with the drum 2 and simultaneously releasing the pawl 10 from the ratchet 9 and then backing the machine the required distance, the weight of the fork assisting in this backing movement.

Having thus described the invention, what is claimed as new is:—

1. In a stacker, the combination with a frame-work and a rake mounted thereon, of means for raising the rake, said means including an actuating axle, a drum mounted loosely thereon and provided with a ratchet wheel, a clutch adapted to secure the drum to the axle, an angular shipper lever fulcrumed on the framework and having one of its arms connected to the clutch, a pawl arranged to engage the ratchet wheel and pivotally mounted on the framework, a link rod connected at one end to the pawl, an actuating rod connected at its forward end to the other arm of the shipper lever, the rear end of the link rod being connected to the actuating rod near the forward end of the latter, and a lever connected to the rear end of the actuating rod for the operation thereof.

2. In a stacker, the combination with a framework, and a rake mounted thereon, of means for raising the rake, said means including an actuating axle, a drum mounted loosely thereon and provided with a ratchet wheel, a clutch adapted to secure the drum to the axle, a shipper-lever fulcrumed on the framework and operatively connected to the clutch, an actuating rod, a pawl mounted on the framework and designed to engage the ratchet, a link-rod connected to the said pawl and a strap connecting the actuating rod to the shipper-lever, said strap being formed with an angular end to which the rear end of the link-rod is connected.

In testimony whereof I affix my signature in presence of two witnesses.

FRANK WYATT. [L. S.]

Witnesses:
R. P. CRAVENS,
R. H. CRAVENS.